(12) United States Patent
Sun et al.

(10) Patent No.: US 12,052,200 B2
(45) Date of Patent: Jul. 30, 2024

(54) METHOD AND APPARATUS FOR DTX DETECTION FOR SIDELINK GROUPCAST TRANSMISSION

(71) Applicant: LENOVO (BEIJING) LIMITED, Beijing (CN)

(72) Inventors: Zhennian Sun, Beijing (CN); Xiaodong Yu, Beijing (CN); Haipeng Lei, Beijing (CN); Hongmei Liu, Beijing (CN); Jing Han, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 680 days.

(21) Appl. No.: 17/279,920

(22) PCT Filed: Nov. 8, 2018

(86) PCT No.: PCT/CN2018/114629
§ 371 (c)(1),
(2) Date: Mar. 25, 2021

(87) PCT Pub. No.: WO2020/093327
PCT Pub. Date: May 14, 2020

(65) Prior Publication Data
US 2021/0344473 A1  Nov. 4, 2021

(51) Int. Cl.
*H04L 5/00* (2006.01)
*H04L 1/1812* (2023.01)
*H04W 72/20* (2023.01)

(52) U.S. Cl.
CPC .......... *H04L 5/0058* (2013.01); *H04L 1/1812* (2013.01); *H04L 5/0055* (2013.01); *H04W 72/20* (2023.01)

(58) Field of Classification Search
CPC ... H04L 5/0058; H04L 1/1812; H04L 5/0055; H04W 72/20
See application file for complete search history.

(56) References Cited

U.S. PATENT DOCUMENTS

2014/0328329 A1  11/2014 Novlan et al.
2016/0337103 A1* 11/2016 Kim ................ H04W 72/21
(Continued)

FOREIGN PATENT DOCUMENTS

CN  106559189 A    4/2017
WO  2015017983 A1  2/2015
(Continued)

OTHER PUBLICATIONS

Samsung, Discussion on support of unicast, groupcast and broadcast for Nr V2X, 3GPP TSG RAN WG1 #94, R1-1808775, Aug. 20-24, 2018, pp. 1-3, Gothenburg, Sweden.
(Continued)

*Primary Examiner* — Jael M Ulysse
(74) *Attorney, Agent, or Firm* — Kunzler Bean & Adamson

(57) ABSTRACT

The subject application is related to a method and apparatus for DTX detection for sidelink groupcast transmission. A method for transmitting groupcast includes: transmitting a reference signal which can be received by a user equipment (UE) within a group, transmitting another reference signal which can be received by the UE and another UE outside of the group, transmitting a signal, and monitoring appearance of a hybrid automatic repeat request (HARQ) feedback signal on a HARQ feedback resource, wherein the HARQ feedback signal comprises feedback information corresponding to the signal.

20 Claims, 5 Drawing Sheets

(56) References Cited

U.S. PATENT DOCUMENTS

| | | | |
|---|---|---|---|
| 2017/0273128 A1* | 9/2017 | Abedini | H04W 76/14 |
| 2018/0375710 A1* | 12/2018 | Chae | H04L 5/0048 |
| 2019/0052411 A1* | 2/2019 | Chae | H04W 52/242 |
| 2019/0052436 A1* | 2/2019 | Desai | H04W 72/0446 |
| 2019/0158252 A1* | 5/2019 | Li | H04W 76/27 |
| 2019/0165896 A1* | 5/2019 | Huang | H04L 1/1664 |
| 2019/0208387 A1* | 7/2019 | Jiang | H04W 4/46 |
| 2019/0239203 A1* | 8/2019 | Chae | H04L 1/1829 |
| 2019/0327012 A1* | 10/2019 | Park | H04W 4/06 |
| 2019/0341992 A1* | 11/2019 | Zhou | H04W 16/28 |
| 2019/0342047 A1* | 11/2019 | Kim | H04L 1/1825 |
| 2019/0349173 A1* | 11/2019 | Kim | H04L 5/0091 |
| 2019/0364562 A1* | 11/2019 | Chae | H04W 72/0466 |
| 2019/0373631 A1* | 12/2019 | Gulati | H04W 74/0816 |
| 2020/0008225 A1* | 1/2020 | Lee | H04W 72/1273 |
| 2020/0045705 A1* | 2/2020 | Chae | H04W 72/20 |
| 2020/0059766 A1* | 2/2020 | Kim | H04W 28/26 |
| 2020/0100284 A1* | 3/2020 | Li | H04L 1/1854 |
| 2020/0106500 A1* | 4/2020 | Noh | H04B 7/0621 |
| 2020/0106566 A1* | 4/2020 | Yeo | H04W 28/04 |
| 2020/0106567 A1* | 4/2020 | Bharadwaj | H04L 1/1812 |
| 2021/0007103 A1* | 1/2021 | Chae | H04L 5/0053 |
| 2021/0037603 A1* | 2/2021 | Li | H04L 1/1819 |
| 2021/0168648 A1* | 6/2021 | Lee | H04W 4/40 |
| 2021/0195674 A1* | 6/2021 | Park | H04L 1/0026 |
| 2021/0297199 A1* | 9/2021 | Miao | H04L 5/0048 |
| 2021/0306089 A1* | 9/2021 | Fehrenbach | H04L 5/0057 |
| 2021/0306824 A1* | 9/2021 | Li | H04W 4/40 |
| 2021/0307095 A1* | 9/2021 | Kim | H04L 5/0051 |
| 2021/0314985 A1* | 10/2021 | Yang | H04L 5/0082 |
| 2021/0344454 A1* | 11/2021 | Lee | H04L 1/1692 |

FOREIGN PATENT DOCUMENTS

| | | | | |
|---|---|---|---|---|
| WO | WO-2015017983 A1 * | 2/2015 | | H04B 1/713 |
| WO | 2016131344 A1 | 12/2015 | | |

OTHER PUBLICATIONS

Huawei, Hisilicon, Sidelink control channel design of NR V2X, 3GPP TSG RAN WG1 Meeting #94, R1-1808937, Aug. 20-24, 2018, pp. 1-4, Gothenburg, Sweden.

Huawei, Hisilicon, Sidelink PHY structure and procedure for NR V2X, 3GPP TSG RAN WG1 Meeting #94bis, R1-1810138, Oct. 8-12, 2018, pp. 1-15, Chengdu, China.

Nokia, Nokia Shanhai Bell, On Sidelink Unicast, Groupcast and Broadcast, 3GPP TSG RAN WG1 Meeting #94bis, R1-1811426, Oct. 8-12, 2018, pp. 1-5, Chengdu, China.

International Searching Authority, "Notification of Transmittal of the International Search Report and the Written Opinion of the International Searching Authority, or the Declaration", PCT/CN2018/114629, Nov. 8, 2018, pp. 1-7.

3GPP, 3rd Generation Partnership Project; Technical Specification Group Radio Access Network; Discussion on Unicast, Groupcast and Broadcast for NR V2X, 3GPP R1-1810867, Oct. 2018, pp. 1-6.

* cited by examiner

METHOD AND APPARATUS FOR DTX DETECTION FOR SIDELINK GROUPCAST TRANSMISSION

TECHNICAL FIELD

The subject application generally relates to NR sidelink communication, and more specifically to NR sidelink communication through groupcast transmission.

BACKGROUND

Device-to-device (D2D) communication is expected to play a prominent role in upcoming cellular networks as it provides ultra-low latency for communication among users. Vehicle to everything (V2X) is introduced into 5G wireless communication technique. D2D is applicable to public safety and commercial communication use-cases, and also to V2X scenario.

D2D communication allows user equipments (UEs) in close proximity to communicate using a direct link rather than having their radio signal travel all the way through a base station (BS) or core network. In terms of a channel structure, the direct link between two UEs is called a sidelink. Sidelink is an LTE feature introduced in 3GPP (3rd Generation Partnership Project) Release 12, and enables a direct communication between proximal UEs, and data does not need to go through the BS.

In order to meet the requirements of providing relatively good performance on D2D communication, sidelink, or NR sidelink (e.g. advanced 3GPP NR (New radio) V2X service), communication techniques, e.g. sidelink unicast transmission, sidelink groupcast transmission, sidelink broadcast transmission, or the like, are developed.

SUMMARY

Some embodiments of the subject application provide a method for transmitting groupcast. The method includes: transmitting a reference signal which can be received by a user equipment (UE) within a group, transmitting another reference signal which can be received by the UE and another UE outside of the group, transmitting a signal, and monitoring appearance of a hybrid automatic repeat request (HARQ) feedback signal on a HARQ feedback resource, wherein the HARQ feedback signal comprises feedback information corresponding to the signal.

Some embodiments of the subject application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement methods for DTX detection for sidelink groupcast transmission.

Some embodiments of the subject application provide a method for receiving groupcast. The method includes: receiving a reference signal which can be received by a UE within a group, receiving a second reference signal which can be received by the UE and another UE outside of the group, receiving a signal, and transmitting a HARQ feedback signal on a HARQ feedback resource according to a result of receiving the signal.

Some embodiments of the subject application also provide an apparatus. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement methods for DTX detection for sidelink groupcast transmission.

BRIEF DESCRIPTION OF THE DRAWINGS

In order to describe the manner in which advantages and features of the subject application can be obtained, a description of the subject application is rendered by reference to specific embodiments thereof which are illustrated in the appended drawings. These drawings depict only example embodiments of the subject application and are not therefore to be considered as limiting of its scope.

DETAILED DESCRIPTION

Figure 1:
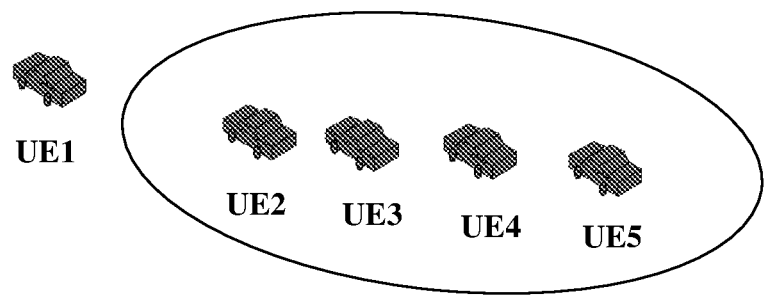
FIG. 1 illustrates an exemplary sidelink groupcast system in accordance with some embodiments of the subject application.

The detailed description of the appended drawings is intended as a description of the currently preferred embodiments of the subject application, and is not intended to represent the only form in which the subject application may be practiced. It should be understood that the same or equivalent functions may be accomplished by different embodiments that are intended to be encompassed within the spirit and scope of the subject application.

Groupcast transmission, which may provide a relatively good performance (e.g. relatively good reliability), may be used to achieve a relatively good reliability of D2D communication (or sidelink) in various scenarios (e.g. 3GPP NR V2X scenario, etc.).

The HARQ feedback technique is used in wireless communication to indicate or represent whether data was correctly (or successfully) received (or decoded) during data transmission (e.g. downlink (DL) transmission or uplink (UL) transmission). HARQ may provide feedback, for example but is not limited to, Positive Acknowledgement (ACK) or Negative Acknowledgement (NACK). ACK may refer to a correct or successful data reception (or decoding). NACK may refer to an erroneously data reception (or decoding).

Particularly, during sidelink groupcast transmission, one case is that all devices within a groupcast group share the same feedback resource (i.e. a common feedback resource), and the shared HARQ feedback resource only carries NACK feedback signals from some devices within a groupcast group, but does not carry any ACK feedback signal, in order to minimize or relieve overhead of the sidelink groupcast system. In other words, under this case, once a receiver identifies that it does not correctly receive (decode) a groupcast message, the receiver transmits NACK feedback signal on the same feedback resource; rather, in response to correctly receiving a groupcast message, the receiver does not transmit any feedback signal on the same feedback resource.

In the case of using the same feedback resource between devices within a groupcast group, after a transmitter transmits a groupcast message (packet), a receiver may not receive any control information related to the groupcast message, and thus does not know to receive the transmitted groupcast message. Accordingly, the receiver does not correctly receive (decode) the groupcast message, and will not transmit any feedback signal on the shared HARQ feedback resource. However, from the transmitter's perspective, since no feedback signal is transmitted on the shared HARQ feedback resource, the transmitter may determine or decide that the receiver has correctly received the groupcast message. As a result, Discontinuous Transmission (DTX) happens during sidelink groupcast transmission, and the transmitter and the receiver have misunderstanding about the sidelink groupcast transmission. Given this, the transmitter cannot recognize the DTX issue and will not perform any operation to solve the DTX issue. A DTX issue may also arise in other communication scenarios and also needs to be solved.

Some embodiments of the subject application provide a mechanism using the HARQ feedback technique for detecting DTX during communication techniques (e.g. the sidelink groupcast transmission).

Some embodiments of the subject application provide a method for detecting DTX during sidelink groupcast transmission. Some embodiments of the subject application provide a method for detecting DTX during sidelink groupcast transmission using the HARQ feedback technique.

Some embodiments of the subject application provide an apparatus for detecting DTX during sidelink groupcast transmission. Some embodiments of the subject application provide an apparatus for detecting DTX during sidelink groupcast transmission using the HARQ feedback technique.

Embodiments of the subject application may be provided in a network architecture that adopt various service scenarios, for example but is not limited to, 3GPP 5G NR (new radio), 3GPP LTE (Long Term Evolution) Release 12 and onwards, etc.

FIG. 1 illustrates an exemplary sidelink groupcast system in accordance with some embodiments of the subject application.

Referring to FIG. 1, the sidelink groupcast system includes some UEs, e.g. UE1, UE2, UE3, UE4, and UE5. UE1, UE2, UE3, UE4, and UE5 are configured to perform groupcast transmission. It is contemplated that the sidelink groupcast system may include more or less UEs in accordance with some other embodiments of the subject application. Although each of the UEs in FIG. 1 is shown in the shape of a car, it is contemplated that a sidelink groupcast system may include any type of UE (e.g. a cell phone, a computer, a laptop, IoT (internet of things) device or other type of device) in accordance with some other embodiments of the subject application.

A group of UEs which are configured to perform groupcast transmission may be referred to as a groupcast group of UEs or a sidelink groupcast group of UEs. UE(s) under NR V2X scenario may be referred to as V2X UE(s).

Still referring to FIG. 1, UE1, UE2, UE3, UE4, and UE5 together form a groupcast group of UEs. UE1 may function as a source UE. Each of UE2, UE3, UE4, and UE5 may function as a member UE.

A source UE within a groupcast group may transmit a groupcast message or a groupcast packet to all member UEs within the same groupcast group. Some or all member UEs may receive the groupcast message (packet) from a source UE. A groupcast message may include scheduling assignment (SA) and groupcast data. SA in a groupcast message may indicate transmitting information associated with groupcast data in the groupcast message.

In some embodiments of the subject application, SA of a groupcast message is carried in Physical Sidelink Control Channel (PSCCH), and groupcast data of the groupcast message is carried in Physical Sidelink Share Channel (PSSCH). PSCCH may further carry a reference signal. For example, PSCCH may carry a demodulation reference signal (DMRS).

HARQ technique (e.g. the physical layer HARQ feedback technique) used in the subject application may provide a relatively good reliability of sidelink groupcast transmission under various scenarios (e.g. NR V2X scenario).

In some embodiments of the subject application, a HARQ feedback resource(s) is shared between UEs within a groupcast group (e.g. UE2, UE3, UE4, and UE5 as shown in FIG. 1). A HARQ feedback resource(s) may be a time resource, a frequency resource, a code resource, or a combination thereof. A HARQ feedback resource(s) may be shared only between some UEs within a groupcast group.

A HARQ feedback resource(s) may be shared between all UEs within a groupcast group. Each of UEs within a groupcast group is configured to aware of information associated with HARQ feedback resource(s) shared between the UEs within a groupcast group. Each of UEs within a groupcast group may add information on the shared HARQ feedback resource(s). Each of UEs within a groupcast group may monitor the shared HARQ feedback resource(s). The shared HARQ feedback resource(s) may be detectable to each of UEs within a groupcast group. Each of UEs within a groupcast group may read information from the shared HARQ feedback resource(s).

A shared HARQ feedback resource(s) may carry one HARQ feedback signal of a single UE within a groupcast group. A shared HARQ feedback resource(s) may carry a HARQ feedback signal which is an accumulation, combination, or sum of various feedback signals associated with two or more UEs within a groupcast group. For example, a HARQ feedback signal may be generated by accumulating, combining, or summing one HARQ feedback signal of one UE with another HARQ feedback signal of another UE within a groupcast group. For a further example, a HARQ feedback signal may be generated by accumulating, combining, or summing one HARQ feedback signal of one UE with other HARQ feedback signals of other UEs within a groupcast group. A HARQ feedback signal may indicate HARQ feedback results for groupcast data transmission from two or more UEs within a groupcast group.

According to some embodiments of the subject application, UEs within a groupcast group share a HARQ feedback resource. The shared HARQ feedback resource may carry only an NACK feedback signal from a UE within a groupcast group. The shared HARQ feedback resource may carry only NACK feedback signals from some UEs within a groupcast group. The shared HARQ feedback resource may carry only NACK feedback signals from all the UEs within a groupcast group. In other words, the shared HARQ feedback resource does not carry ACK, and therefore the amount of HARQ feedback resources is reduced, such that overhead of the sidelink groupcast system as shown in FIG. 1 is minimized or relieved.

Figure 2:
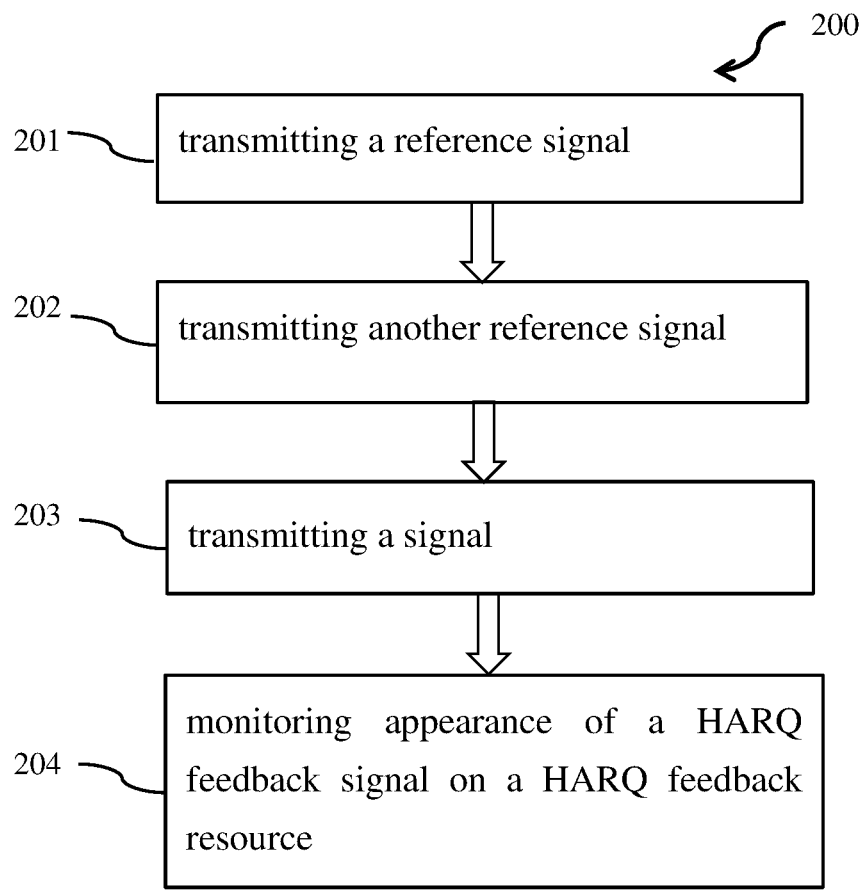
FIG. 2 illustrates a flow chart of method for performing sidelink groupcast transmission in accordance with some embodiments of the subject application.

FIG. 2 illustrates a flow chart of method for performing sidelink groupcast transmission in accordance with some embodiments of the subject application. Referring to FIG. 2, method 200 is performed by a UE transmitting groupcast message (packet) (i.e. a source UE, e.g. UE1 as illustrated and described with reference to FIG. 1) in some embodiments of the subject application.

In operation 201, a source UE (e.g. UE1 as shown in FIG. 1) transmits a reference signal. In operation 202, the source UE transmits another reference signal. In some embodiments, the reference signal may only be received by a UE within a groupcast group, and the transmitted another reference signal may be received by both a UE within a groupcast group and a UE outside of the groupcast group. In another some embodiments, the reference signal may be received by both a UE within a groupcast group and a UE outside of the groupcast group, and the transmitted another reference signal may only be received by a UE within a groupcast group.

In some embodiments of the subject application, each of the reference signal and the transmitted another reference signal is a demodulation reference signal (DMRS). The reference signal, the transmitted another reference signal, or a combination thereof may be used to perform channel estimation.

In some embodiments of the subject application, the reference signal is one of a common DMRS and a group specified DMRS; and the transmitted another reference signal is the rest one of the common DMRS and the group specified DMRS. A group specified DMRS may be referred to as a group dedicated DMRS or like.

A common DMRS may be used by some or all UEs within and outside of a groupcast group, in order to perform channel estimation. After channel estimation using a common DMRS, a UE within or outside of a groupcast group may receive an SA signal, which indicates transmitting information in a groupcast message, from a source UE with higher accuracy and efficiency.

In particular, after receiving a common DMRS, a UE outside of a groupcast group may perform channel estimation, and then receive SA. From the received SA, the UE outside of a groupcast group may identify sidelink resource(s) occupied by groupcast data that is associated with the SA, and then not use the occupied sidelink resource(s), in order to avoid any resource confliction.

After receiving a common DMRS, a UE within a groupcast group may perform channel estimation, receive SA, identify occupied sidelink resource(s) from the received SA, and then receive groupcast data that is associated with the SA correspondingly.

In other words, by transmitting a common DMRS and SA, a source UE may notify occupied sidelink resource(s) to UEs outside of a groupcast group, so as to avoid resource confliction, and may notify occupied sidelink resource(s) to UEs within a groupcast group, so as to transmit a groupcast message.

A group specified DMRS may only be used by one or more UEs (e.g. members UEs) within a groupcast group, in order to perform channel estimation. Based on the channel estimation result(s) by using a group specified DMRS, a UE within a groupcast group may receive a signal (e.g. SA) from a source UE.

Alternatively, a UE within a groupcast group may use both a common DMRS and a group specified DMRS to perform channel estimation, in order to increase a decoding probability or correctness during receiving SA. For example, during performing channel estimation, by using both a common DMRS and a group specified DMRS, a UE within a groupcast group may obtain more precise results of channel estimation and thus may receive SA more easily and efficiently. Based on the received SA, UEs within a groupcast group may receive groupcast data that is associated with the SA.

In operation 203, the source UE transmits a signal (e.g. SA signal). The signal may be any control signal that may schedule the following data transmission. In operation 204, the source UE monitors appearance of a HARQ feedback signal on a HARQ feedback resource, wherein the HARQ feedback signal comprises feedback information corresponding to the signal transmitted in operation 203. The HARQ feedback signal may include a signal from one UE (e.g. one of UE2, UE3, UE4, and UE5 as illustrated and described with reference to FIG. 1). The HARQ feedback signal may include a signal accumulated by signal(s) from some or all UEs within the groupcast group (e.g. some or all of UE2, UE3, UE4, and UE5 as illustrated and described with reference to FIG. 1).

In some embodiments of the subject application, in the case that a UE within the groupcast group successfully receives the transmitted another reference signal but does not successfully receive the transmitted signal (e.g. SA signal), a HARQ feedback signal on a HARQ feedback resource comprising NACK or information indicating DTX is transmitted. A source UE (e.g. UE1 as shown in FIG. 1) knows that the signal is unsuccessfully transmitted to a member UE within the groupcast group, if the HARQ feedback signal, comprising NACK or information indicating DTX, appears on the HARQ feedback resource. After that, the source UE may transmit the same signal (e.g. SA signal transmitted in operation 203) again, to enhance transmission reliability. Through these embodiments, a source UE may rapidly and precisely detect DTX which happens during the sidelink groupcast transmission and thus adopt corresponding operations to solve the DTX issue.

In some embodiments of the subject application, in the case that the HARQ feedback signal monitored in operation 204 does not carry DTX or NACK feedback information corresponding to the signal (e.g. SA signal) which transmitted in operation 203, a source UE may determine that the signal has been correctly received by member UE(s) within the groupcast group. In other words, in the case that the signal transmitted in operation 203 is successfully received by member UEs within the groupcast group, a source UE receives no HARQ feedback signal on the HARQ feedback resource.

In some embodiments of the subject application, in response to receiving no HARQ feedback signal on the HARQ feedback resource, a source UE may transmit another signal (e.g. groupcast data related to the transmitted SA) in a following operation of the sidelink groupcast transmission. Then, the source UE may monitor appearance of another HARQ feedback signal on another HARQ feedback resource. The abovementioned another HARQ feedback signal comprises feedback information corresponding to the transmitted another signal. The abovementioned another HARQ feedback resource is different from the HARQ feedback resource, which carries the HARQ feedback signal monitored in operation 204.

In some embodiments of the subject application, each of the HARQ feedback resource and another HARQ feedback resource is a HARQ feedback resource shared between some or all UEs within a groupcast group. All details about a shared HARQ feedback resource described in the subject application are applicable for the HARQ feedback resource and the abovementioned another HARQ feedback resource.

For example, in the case that a UE within the groupcast group successfully receives the SA signal but does not successfully receive groupcast data related to the transmitted SA, the UE within the groupcast group may transmits NACK in another HARQ feedback signal on another HARQ feedback resource. A source UE (e.g. UE1 as shown in FIG. 1) knows that groupcast data is not successfully transmitted to the UE within the groupcast group if the abovementioned another HARQ feedback signal comprising NACK appears on the abovementioned another HARQ feedback resource. After that, the source UE may transmit the same groupcast data related to the transmitted SA again, in order to enhance transmission reliability.

In the case that a UE within the groupcast group successfully receives both the SA signal and groupcast data related to the transmitted SA, the UE within the groupcast group does not transmit any feedback information in another HARQ feedback signal on another HARQ feedback resource. In other words, under this case, a source UE (e.g. UE1 as shown in FIG. 1) will receive no HARQ feedback signal on the abovementioned another HARQ feedback resource. Then, the source UE may determine that groupcast data has been correctly received by UEs within the groupcast group. In other words, in the case that the abovementioned another HARQ feedback resource is shared between some or all UEs within a groupcast group, when UEs within the groupcast group successfully receive the transmitted another signal, the source UE receives no HARQ feedback signal on the abovementioned another HARQ feedback resource.

In some embodiments of the subject application, the HARQ feedback resource is a HARQ feedback resource shared between some or all UEs within a groupcast group, whereas another HARQ feedback resource is a dedicated HARQ feedback resource for each UE within a groupcast group (e.g. each of UE2, UE3, UE4 or UE5 as shown in FIG. 1). By adopting a dedicated HARQ feedback resource as another HARQ feedback resource, each UE within a groupcast group use its own dedicated HARQ feedback resource to include HARQ feedback signal "NACK" or HARQ feedback signal "ACK," for reporting, to a source UE, the feedback information corresponding to groupcast data which is scheduled by SA and transmitted by the source UE.

In response receiving another feedback signal comprising NACK on another HARQ feedback resource, the source UE determines that the groupcast data is not correctly received by UEs within the groupcast group. Then, the source UE may again transmit the same groupcast data related to the transmitted SA, in order to enhance transmission reliability and efficiency.

In response receiving another feedback signal comprising ACK on another HARQ feedback resource, the source UE determines that the groupcast data has been correctly received by UEs within the groupcast group. Then, the source UE may perform subsequent operations in the sidelink groupcast transmission.

Figure 3:
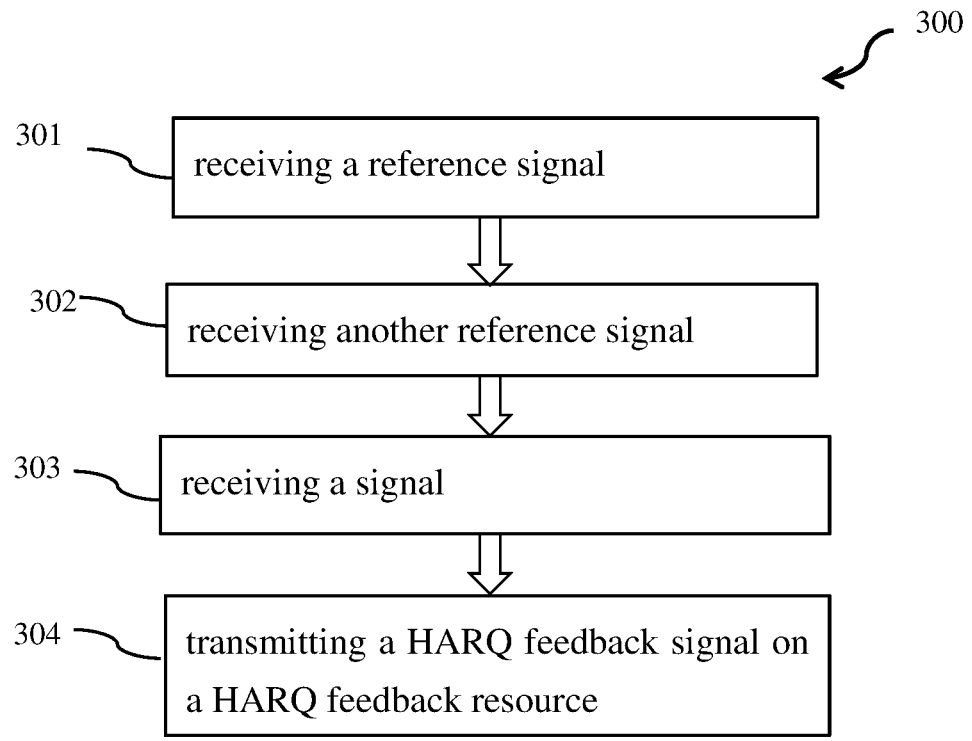
FIG. 3 illustrates a flow chart of method for performing sidelink groupcast transmission in accordance with some embodiments of the subject application.

FIG. 3 illustrates a flow chart of method for performing sidelink groupcast transmission in accordance with some embodiments of the subject application. Referring to FIG. 3, method 300 is performed by a UE within a groupcast group (e.g. a member UE2, UE3, UE4 or UE5 as illustrated and described with reference to FIG. 1) in accordance with some embodiments of the subject application.

In operation 301, a member UE (e.g. UE2 as shown in FIG. 1) receives a reference signal. In operation 302, the member UE receives another reference signal. For example, one of the reference signal and the abovementioned another reference signal is received by both a UE within a groupcast group and a UE outside of the groupcast group, while the other one is only received by a UE within a groupcast group.

In some embodiments of the subject application, each of the reference signal and another reference signal is a demodulation reference signal (DMRS). The reference signal, the abovementioned another reference signal, or a combination thereof may be used to perform channel estimation. In some embodiments of the subject application, the reference signal is one of a common DMRS and a group specified DMRS; and the abovementioned another reference signal is the rest one of the common DMRS and the group specified DMRS.

In operation 303, the member UE receives a signal (e.g. SA signal). The signal may be any signal that schedules the following data transmission. After receiving the reference signal and the abovementioned another reference signal, the member UE may perform channel estimation. By performing channel estimation based on both the reference signal and the abovementioned another reference signal, a member UE may receive the signal more efficiently and precisely.

In operation 304, the member UE transmits a HARQ feedback signal on a HARQ feedback resource according to a result of whether successfully receiving the signal. In the embodiments that a HARQ feedback resource(s) is shared between UEs within a groupcast group (e.g. UE2, UE3, UE4, and UE5 as shown in FIG. 1), if the signal (e.g. SA signal) is unsuccessfully received in operation 303, the member UE (e.g. UE2 as shown in FIG. 1) sends NACK or information indicating DTX in the HARQ feedback signal on the HARQ feedback resource, to notify the source UE this result; whereas if the signal (e.g. SA signal) is successfully received in operation 303, the member UE does not send ACK in the HARQ feedback signal on a HARQ feedback resource. In the case that the signal is successfully received by all UEs within a groupcast group, a source UE receives no HARQ feedback signal on the HARQ feedback resource.

In following operations of the sidelink groupcast transmission after operation 303, the member UE may receive another signal (e.g. groupcast data related to SA), and transmits another HARQ feedback signal on another HARQ feedback resource according to a result of receiving the abovementioned another signal. For example, in response to successfully receiving the SA signal in operation 303, the member UE may identify, from the SA signal, transmitting information associated with groupcast data in the groupcast message (packet), and then receive the corresponding groupcast data associated with the SA. Then, the member UE will transmit feedback information corresponding to the groupcast data in another HARQ feedback resource according to a result of receiving the groupcast data.

Another HARQ feedback resource is different from the HARQ feedback resource carrying the HARQ feedback signal which is transmitted in operation 304. Each of the HARQ feedback resource and the abovementioned another HARQ feedback resource may be a HARQ feedback resource shared between some UEs or all UEs within a groupcast group. In some embodiments, another HARQ feedback resource may be a dedicated HARQ feedback resource for a UE within a groupcast group. All details about a shared HARQ feedback resource and a dedicated HARQ feedback resource described in the subject application are applicable for the HARQ feedback resource and the abovementioned another HARQ feedback resource.

For example, in the case that another HARQ feedback resource is shared between some UEs or all UEs within a groupcast group, if the member UE successfully receives the SA signal but unsuccessfully receive the groupcast data scheduled by the SA signal, the member UE transmits NACK in another HARQ feedback signal on another HARQ feedback resource; whereas if the member UE successfully receives both the SA signal and the groupcast data scheduled by the SA signal, the member UE does not transmit the another HARQ feedback signal on another HARQ feedback resource.

In the case that another HARQ feedback resource is a dedicated HARQ feedback resource for a member UE, if the member UE successfully receives the SA signal but unsuccessfully receive the groupcast data, the member UE transmits NACK in another HARQ feedback signal on another HARQ feedback resource; whereas if the member UE successfully receives both the SA signal and the groupcast data, the member UE transmits ACK in another HARQ feedback signal on another HARQ feedback resource.

In some embodiments of the subject application, the reference signal is group specified reference signal generated according to a value related to a group identifier of a groupcast group, and another reference signal is a common reference signal generated according to a value which is known by UEs within and outside of a groupcast group.

For example, a common DMRS may be generated by a pseudo-random sequence generator, wherein the pseudo-random sequence generator is initialized with a value (e.g. an integer) which is known by all UEs within and outside of a groupcast group. A group specified DMRS may be generated by a pseudo-random sequence generator, wherein the pseudo-random sequence generator is initialized with a value (e.g. an integer) of Group Destination ID or a value that is derived or obtained from Group Destination ID.

Being initialized with different values, a pseudo-random sequence generator will generate different pseudo-random sequences. Only a UE that knows the initial value may identify and receive the generated pseudo-random sequence. As a result, all UEs within and outside of a groupcast group may receive a common DMRS, and only UEs within a groupcast group may receive a group specified DMRS.

In some embodiments of the subject application, sequence generation of a common DMRS or a group specified DMRS may be as below:
A UE assumes a reference-signal sequence $r_l^{(m)}$ for OFDM symbol l is defined by $$r_l(m) = \frac{1}{\sqrt{2}}(1 - 2 \cdot c(2m)) + j\frac{1}{\sqrt{2}}(1 - 2 \cdot c(2m+1)).$$

wherein the pseudo-random sequence c(i) is a PN sequence. The pseudo-random sequence generator shall be initialized with $$c_{init} = (2^{17}(N_{symb}^{slot} n_{s,f}^\mu + l + 1)(2N_{ID}+1) + 2N_{ID}) \mod 2^{31}$$

wherein $N_{symb}^{slot}$ is the number of symbols per slot, l is the OFDM symbol number within the slot, and $n_{s,f}^\mu$ is the slot number within a frame, and $N_{ID}$ may be an integer for the common DMRS, and can be configured by a base station (e.g. gNB) or preconfigured by a user device (e.g. a UE); or $N_{ID}$ may be Group Destination ID or an integer derived from Group Destination ID Generic pseudo-random sequences are defined by a length-31 Gold sequence. The output sequence c(n) of length $M_{PN}$, where n=0, 1, . . . , $M_{PN}$−1, is defined by $$c(n) = (x_1(n+N_C) + x_2(n+N_C)) \mod 2$$

$$x_1(n+31) = (x_1(n+3) + x_1(n)) \mod 2$$

$$x_2(n+31) = (x_2(n+3) + x_2(n+2) + x_2(n+1) + x_2(n)) \mod 2$$

wherein $N_C$=1600 and the first m-sequence $X_1(n)$ is initialized with $x_1(0)$=1, $x_1(n)$=0, n=1, 2, . . . , 30. The initialization of the second m-sequence, $x_2(n)$, is denoted by $c_{init} = \Sigma_{1-0}^{30} x_2(i) \cdot 2^i$ with the value depending on the application of the sequence.

Figure 4:
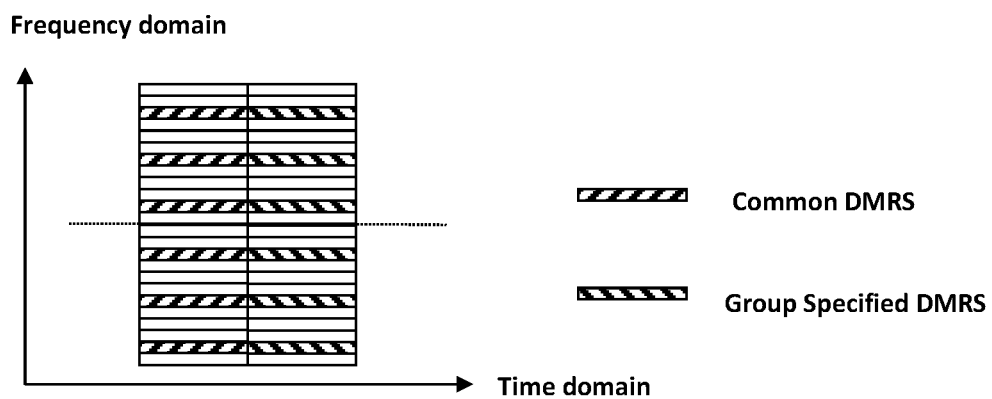
FIG. 4 illustrates an exemplary structure of sidelink groupcast transmission in accordance with some embodiments of the subject application.

FIG. 4 illustrates an exemplary structure of sidelink groupcast transmission in accordance with some embodiments of the subject application. Specifically, FIG. 4 shows a structure of PSCCH, which carries both a common DMRS and a group specified DMRS that are marked by lines of different directions.

Referring to FIG. 4, PSCCH includes two Physical resource blocks (PRBs) separated by the middle dashed line, each PRB includes twelve sub-carriers and two symbols. In other words, PSCCH shown in FIG. 4 includes twenty-four sub-carriers in total for each symbol.

In addition to some symbols in PSCCH carrying common DMRSs and group specified DMRSs, other symbols in the sub-carriers may carry other type of data or signals (e.g. SA signal). Arrangements of data on symbols in PSCCH may vary in different embodiments.

According to the embodiments of FIG. 4, the third, seventh, eleventh, fifth, nineteenth, and twenty-third sub-carriers in PSCCH carry common DMRSs on the left symbols and carry group specified DMRSs on the right symbols, respectively; while other sub-carriers in PSCCH carry other type of data or signals (e.g. SA signal).

Figure 5:
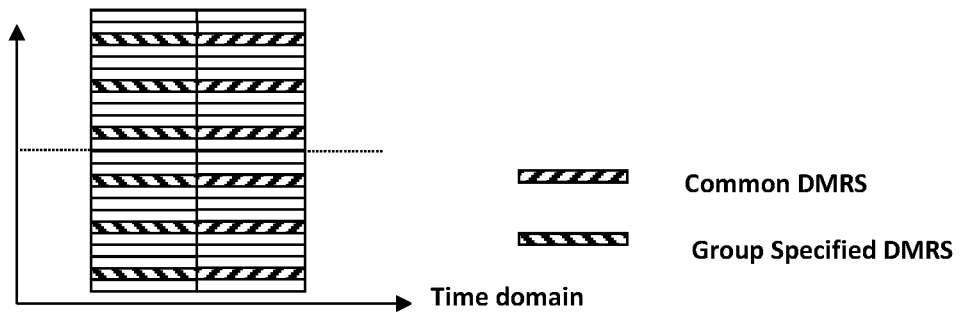
FIG. 5 illustrates another exemplary structure of sidelink groupcast transmission in accordance with some embodiments of the subject application.

FIG. 5 illustrates an exemplary structure of sidelink groupcast transmission in accordance with some embodiments of the subject application. FIG. 5 shows a similar structure of PSCCH to FIG. 4, which carries common DMRSs, group specified DMRSs, and other type of data or signals (e.g. SA signal). According to the embodiments of FIG. 5, the third, seventh, eleventh, fifth, nineteenth, and twenty-third sub-carriers in PSCCH carry group specified DMRSs on the left symbols and carry common DMRSs on the right symbols, respectively.

Figure 6:
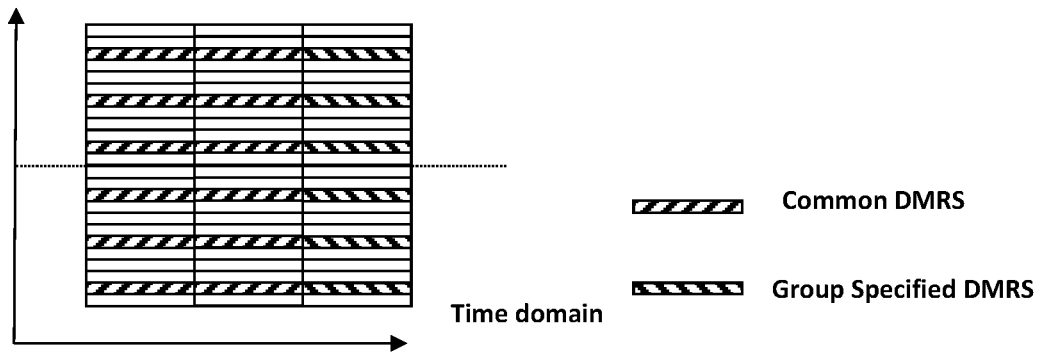
FIG. 6 illustrates another exemplary structure of sidelink groupcast transmission in accordance with some embodiments of the subject application.

FIG. 6 illustrates another exemplary structure of sidelink groupcast transmission in accordance with some embodiments of the subject application. Specifically, FIG. 6 shows a structure of PSCCH, which includes two Physical resource blocks (PRBs) separated by the middle dashed line, each PRB includes twelve sub-carriers and three symbols. In other words, PSCCH shown in FIG. 6 includes twenty-four sub-carriers in total for each symbol.

According to the embodiments of FIG. 6, the third, seventh, eleventh, fifth, nineteenth, and twenty-third sub-carriers in PSCCH carry common DMRSs on both the left and middle symbols and carry group specified DMRSs on the right symbols, respectively; while other sub-carriers in PSCCH carry other type of data or signals (e.g. SA signal).

Figure 7:
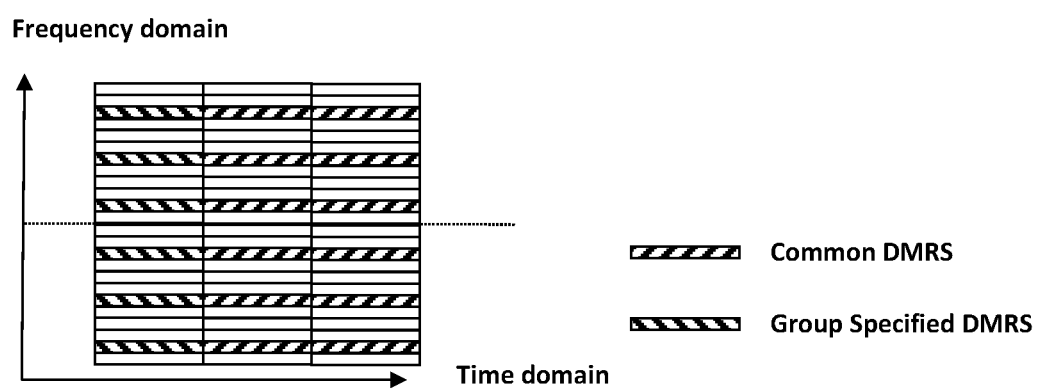
FIG. 7 illustrates another exemplary structure of sidelink groupcast transmission in accordance with some embodiments of the subject application.

FIG. 7 illustrates another exemplary structure of sidelink groupcast system in accordance with some embodiments of the subject application. FIG. 7 shows a similar structure of PSCCH to FIG. 6, which carries common DMRS, group specified DMRS, and other type of data or signals (e.g. SA signal). According to the embodiments of FIG. 7, the third, seventh, eleventh, fifth, nineteenth, and twenty-third sub-carriers in PSCCH carry group specified DMRSs on the left symbols and carry common DMRSs on both the middles and right symbols, respectively.

Although FIGS. 4-7 show that PSCCH carry group specified DMRS and common DMRS in similar sub-carriers, it can be contemplated that each of group specified DMRS and common DMRS may be carried in different sub-carriers or different symbols of sub-carriers in PSCCH.

In some embodiments of the subject application, after receiving PSCCH, a UE within a groupcast group may decode all of common DMRSs, group specified DMRSs, and SA, and then, the UE may receive groupcast data associated with the SA.

In some embodiments of the subject application, after receiving PSCCH, a UE outside of a groupcast group may decode common DMRSs and SA, and then identify the occupied sidelink resource(s) indicated by the SA and avoid using such sidelink resource(s), in order to avoid any resource confliction.

In some embodiments of the subject application, after acquiring channel state information or channel measurement result(s) regarding a groupcast group, a source UE may determine to distribute dedicated resource(s), instead of common resource(s), to some UEs within a groupcast group, in order to prevent DTX issue or reduce the probability of happening DTX. For example, a source UE may, according to channel state information, distribute shared HARQ feedback resource(s) (i.e. common HARQ feedback resource(s)) to some UEs within a groupcast group and distribute dedicated HARQ feedback resource(s) to some other UEs within the same groupcast group.

A source UE may acquire channel state information or channel measurement result(s) of member UEs in a groupcast group by several manners. One possible manner is that a source UE initiates channel measurement and obtains Reference Signal Receiving Power (RSRP) or Reference Signal Receiving Quality (RSRQ). One possible manner is that a member UE initiates channel measurement and feedbacks Channel State Information (CSI), e.g. Channel Quality Information (CQI), to a source UE.

According some embodiments of the subject application, by considering the channel measurement result(s), a source UE may determine whether shared HARQ feedback resource(s) or dedicated HARQ feedback resource(s) is distributed to a certain UE. For instance, a source UE may distribute dedicated HARQ feedback resource(s) to some UEs within a groupcast group having low RSRP or RSRQ; and a source UE may distribute shared HARQ feedback resource(s) to some UEs within a groupcast group having high RSRP or RSRQ.

According to specific receiving result(s) of data within a groupcast message, a UE may transmit ACK or NACK feedback signal on dedicated HARQ feedback resource(s), and a UE may only transmit NACK feedback signal on shared HARQ feedback resource(s). Through this mechanism, the probability of happening DTX may be reduced, without causing too much overhead of HARQ feedback resource(s).

Specifically, in the case of assigning dedicated HARQ feedback resource(s) to a UE within a groupcast group, if the UE receives SA but does not receive the groupcast data associated with the SA, the UE transmits NACK feedback signal on dedicated HARQ feedback resource(s); and if the UE receives both SA and the groupcast data associated with the SA, the UE transmits ACK feedback signal on dedicated HARQ feedback resource(s).

In the case of assigning shared HARQ feedback resource(s) to a UE within a groupcast group, if the UE receives SA but does not receive the groupcast data associated with the SA, the UE transmits NACK feedback signal on shared HARQ feedback resource(s); however, if the UE receives both SA and the groupcast data associated with the SA, the UE does not transmit any feedback signal on shared HARQ feedback resource(s).

Figure 8:
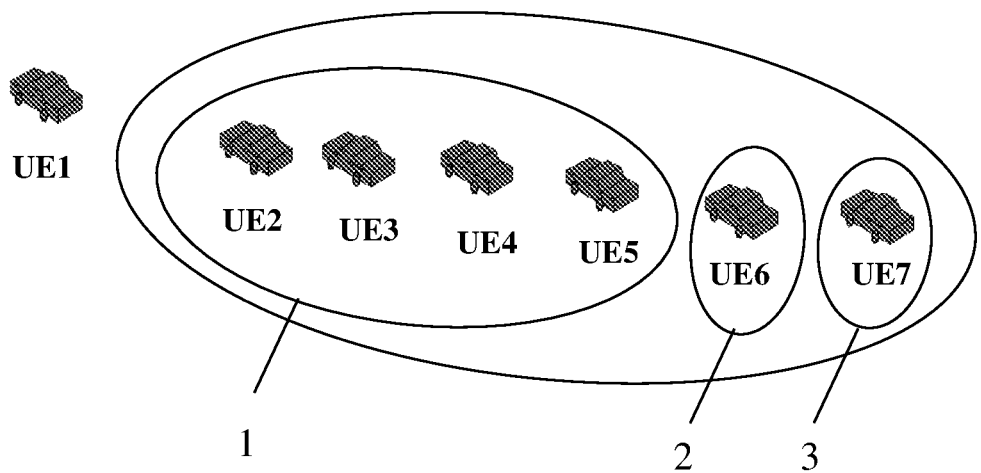
FIG. 8 illustrates another exemplary sidelink groupcast system in accordance with some embodiments of the subject application.

FIG. 8 illustrates another exemplary sidelink groupcast system in accordance with some embodiments of the subject application.

FIG. 8 shows a sidelink groupcast system similar to that of FIG. 1 and includes seven UEs in total (i.e. UE1 which functions as a source UE, and UE2, UE3, UE4, UE5, UE6, and UE7 which functions as a source member UEs). It is contemplated that the sidelink groupcast system in FIG. 8 may include more or less UEs and UEs in the sidelink groupcast system may be any type of UEs in accordance with some other embodiments of the subject application.

In some embodiments of the subject application, a source UE (i.e. UE1) in FIG. 8 performs channel measurement and acquires RSRPs from each group member. For instance, if UE1 determines that RSRPs of UE2-UE5 are above a threshold and RSRPs of UE6 and UE7 are below a threshold, which means that the probability of happening DTX in UE2-UE5 is low whereas the probability of happening DTX in UE6 and UE7 is high, UE1 may assign a shared HARQ feedback resource "1" as shown in FIG. 8 in to UE2-UE5 and assign two dedicated HARQ feedback resources "2" and "3" as shown in FIG. 8 to UE6 and UE7, respectively. Through such assignments, DTX issues of UEs in the sidelink groupcast system of FIG. 8 will be avoided.

Since shared HARQ feedback resource(s) is assigned to UE2-UE5, if one UE of UE2-UE5 receives SA but does not receive the groupcast data associated with the SA, the UE transmits NACK feedback signal on shared HARQ feedback resource(s); however, if one UE of UE2-UE5 receives both SA and the groupcast data associated with the SA, the UE does not transmit any feedback signal on shared HARQ feedback resource(s). A HARQ feedback signal on shared HARQ feedback resource(s) assigned to UE2-UE5 may be generated by accumulating, combining, or summing one HARQ feedback signal of one UE of UE2-UE5 with one or more other HARQ feedback signals of one or more other UEs of UE2-UE5.

Since dedicated HARQ feedback resource(s) is assigned to UE6 and UE7, if UE6 or UE7 receives SA but does not receive the groupcast data associated with the SA, UE6 or UE7 transmits NACK feedback signal on dedicated HARQ feedback resource(s); and if UE6 or UE7 receives both SA and the groupcast data associated with the SA, UE6 or UE7 transmits ACK feedback signal on dedicated HARQ feedback resource(s).

Figure 9:
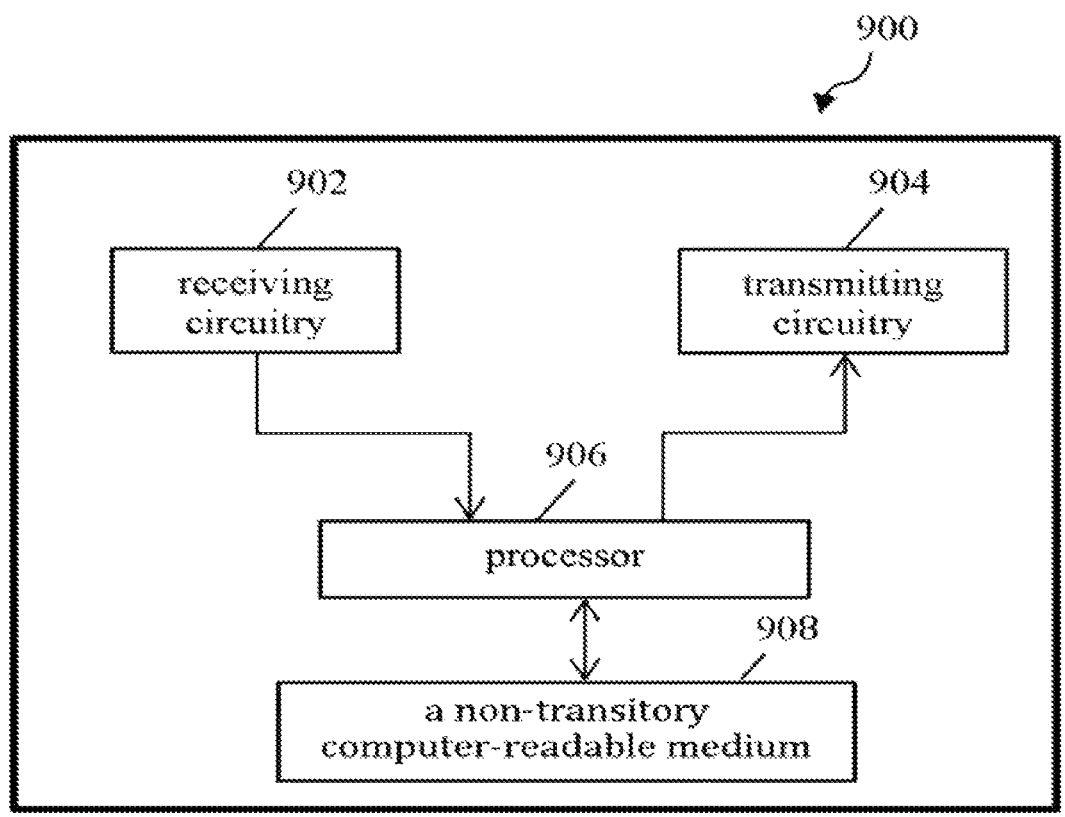
FIG. 9 illustrates a block diagram of an exemplary apparatus in accordance with some embodiments of the subject application.

FIG. 9 illustrates a block diagram of an exemplary apparatus in accordance with some embodiments of the subject application.

Referring to FIG. 9, the apparatus 900 may include a non-transitory computer-readable medium 908, a receiving circuitry 902, a transmitting circuitry 904, and a processor 906 coupled to the non-transitory computer-readable medium 908, the receiving circuitry and the transmitting circuitry. The apparatus 900 may include a UE, a source UE, a member UE, a V2X UE or other device that supports D2D communication or sidelink transmission.

It is contemplated that some components are omitted in FIG. 9 for simplicity. In some embodiments, the receiving circuitry 902 and the transmitting circuitry 904 may be integrated into a single component (e.g. a transceiver).

In some embodiments, the non-transitory computer-readable medium 908 may have stored thereon computer-executable instructions to cause a processor to implement the operations with respect to the UE(s) as described above. For example, the computer-executable instructions may be executed to cause the processor 906 to control the receiving circuitry 902 and transmitting circuitry 904 to perform the operations with respect to the UE(s) as described and illustrated with respect to FIGS. 2-8.

The method of the subject application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the subject application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method of a base station for transmitting a groupcast transmission, the method comprising:
   transmitting a first reference signal for reception by a first user equipment (UE) within a group;
   transmitting a second reference signal for reception by the first UE and a second UE outside of the group, wherein the second reference signal is generated according to a value which is known by the first UE and the second UE;
   transmitting a first signal; and
   monitoring appearance of a first hybrid automatic repeat request (HARQ) feedback signal on a first HARQ feedback resource, wherein the first HARQ feedback signal comprises feedback information corresponding to whether the first UE received the first signal and the first reference signal.

2. The method of claim 1, wherein:
   a negative acknowledgement or discontinuous transmission in the first HARQ feedback signal is received in the case that the first reference signal is successfully received but the transmitted first signal is not successfully received by the first UE; and
   no first HARQ feedback signal is received in the case that the first signal is successfully received by the first UE.

3. The method of claim 1, wherein the first HARQ feedback resource is a first common HARQ feedback resource for a plurality of UEs in the group.

4. The method of claim 1, wherein each of the first reference signal and the second reference signal is a demodulation reference signal.

5. The method of claim 1, wherein the first reference signal and the second reference signal are both used for performing channel estimation.

6. The method of claim 1, wherein the first reference signal is generated according to a value related to a group identifier of the group.

7. The method of claim 1, further comprising:
   transmitting a second signal; and
   monitoring appearance of a second HARQ feedback signal on a second HARQ feedback resource, wherein the second HARQ feedback signal comprises feedback information corresponding to the second signal.

8. The method of claim 7, wherein the second HARQ feedback resource is a second common HARQ feedback resource for a plurality of UEs in the group.

9. The method of claim 7, wherein the second HARQ feedback resource is a dedicated HARQ feedback resource for the first UE.

10. The method of claim 7, wherein the first signal is transmitted in physical sidelink control channel, and the second signal is transmitted in physical sidelink share channel.

11. The method of claim 7, further comprising:
    a negative acknowledgement in the second HARQ feedback signal is received in the case that the first signal is successfully received but the transmitted second signal is not successfully received by the first UE; and no second HARQ feedback signal is received in the case that the second signal is successfully received by the first UE.

12. A method of a first user equipment (UE) within a group for receiving a groupcast transmission, the method comprising:
   receiving, at the first UE, a first reference signal;
   receiving, at the first UE, a second reference signal which can be received by the first UE and a second UE outside of the group, wherein the second reference signal is generated according to a value which is known by the first UE and the second UE;
   receiving a first signal; and
   transmitting a first hybrid automatic repeat request (HARQ) feedback signal on a first HARQ feedback resource according to a result of receiving the first signal and the first reference signal.

13. The method of claim 12, wherein transmitting the first HARQ feedback signal comprises transmitting a negative acknowledgement or discontinuous transmission in the first HARQ feedback signal in the case that the first reference signal is successfully received but the first signal is not successfully received by the first UE, wherein no first HARQ feedback signal is transmitted in the case that the first signal is successfully received by the first UE.

14. The method of claim 12, wherein the first HARQ feedback resource is a first common HARQ feedback resource for a plurality of UEs in the group.

15. The method of claim 12, wherein each of the first reference signal and the second reference signal is a demodulation reference signal.

16. The method of claim 12, wherein the first reference signal and the second reference signal are used for performing channel estimation.

17. The method of claim 12, wherein the second reference signal is generated according to a value which is known by the first UE and the second UE.

18. The method of claim 12, wherein the first signal is received based on both the first reference signal and the second reference signal.

19. A base station for transmitting a groupcast transmission, the base station comprising:
   at least one memory; and
   at least one processor coupled with the at least one memory and configured to cause the base station to:
      transmit a first reference signal for reception by a first user equipment (UE) within a group;
      transmit a second reference signal for reception by the first UE and a second UE outside of the group, wherein the second reference signal is generated according to a value which is known by the first UE and the second UE;
      transmit a first signal; and
      monitor appearance of a first hybrid automatic repeat request (HARQ) feedback signal on a first HARQ feedback resource, wherein the first HARQ feedback signal comprises feedback information corresponding to whether the first UE received the first signal and the first reference signal.

20. A first user equipment (UE) within a group for receiving a groupcast transmission, the first UE comprising:
   at least one memory; and
   at least one processor coupled with the at least one memory and configured to cause the first UE to:
      receive, at the first UE, a first reference signal;
      receive, at the first UE, a second reference signal which can be received by the first UE and a second UE outside of the group, wherein the second reference signal is generated according to a value which is known by the first UE and the second UE;
      receive a first signal; and
      transmit a first hybrid automatic repeat request (HARQ) feedback signal on a first HARQ feedback resource according to a result of receiving the first signal and the first reference signal.

* * * * *